US007464639B2

(12) United States Patent
Juan

(10) Patent No.: US 7,464,639 B2
(45) Date of Patent: Dec. 16, 2008

(54) AUTOMATIC LIQUID DENSITY-REGULATING DEVICE

(75) Inventor: Pang-Chih Juan, Sanchung (TW)

(73) Assignee: Logic Art Automation Co., Ltd., Sanchung (TW)

( * ) Notice: Subject to any disclaimer, the term of this patent is extended or adjusted under 35 U.S.C. 154(b) by 374 days.

(21) Appl. No.: 11/315,376

(22) Filed: Dec. 23, 2005

(65) Prior Publication Data

US 2007/0145658 A1 Jun. 28, 2007

(51) Int. Cl.
*A23L 1/00* (2006.01)

(52) U.S. Cl. ............................ 99/325; 99/348; 99/468; 99/493

(58) Field of Classification Search ........... 99/327-332, 99/339, 340, 348, 485-487, 467-476, 516, 99/536, 325, 493; 366/198, 249, 136, 141
See application file for complete search history.

(56) References Cited

U.S. PATENT DOCUMENTS 4,762,422 A * 8/1988 Toncelli ...................... 366/141
5,160,198 A * 11/1992 Fillon ......................... 366/198

FOREIGN PATENT DOCUMENTS

EP 1174535 A2 * 1/2002
EP 1808677 A1 * 7/2007

* cited by examiner

*Primary Examiner*—Timothy F. Simone
(74) *Attorney, Agent, or Firm*—Pro-Techtor Int'l Services

(57) ABSTRACT

An automatic liquid density-regulating device according to this invention is provided, comprising a workbench with a preparation area, a stir area, and a storage area; a controlling mechanism at a side of the workbench and connected with a clipping unit; a powder supply mechanism vertically on the preparation area of workbench, on which a plurality of container units may be provided; a weighing mechanism on the preparation area of workbench and connected to the controlling mechanism; a liquid supply mechanism located on the preparation area of workbench and at a side of the weighing mechanism and connected to the controlling mechanism; an absorption mechanism on the preparation area of workbench and at a side of the weighing mechanism. Thus, the device may flexibly set up the preparation flow and automatically pour powder and cold and hot water (or solvent) for achievement of precise and fast liquid density regulation.

5 Claims, 2 Drawing Sheets

AUTOMATIC LIQUID DENSITY-REGULATING DEVICE

FIELD OF THE INVENTION

This invention relates to an automatic liquid density-regulating device and particular to a device that functions to flexibly set up a confection flow and automatically infuse powder and cold and hot water (or solvent) for achievement of precise and fast liquid density regulation.

BACKGROUND OF THE INVENTION

When liquid (mordant) is conventionally prepared for a degree of density, manually, a container unit (a measuring cup) is used and put on a balance and then the amount of powder and liquid is calculated upon a required ratio; next, the required amount of powder is put in the container unit, and after the powder reaches a required precise weight, a dropper is used to absorb a required amount of liquid and to drop it in the container unit of powder, and the powder and the required liquid is stirred to mix; if the preparation has not yet completed for the required ratio, the container unit is put on the balance again and then a required amount of powder is put in the container unit; next, after the powder reaches the required precise weight, the dropper is used to absorb the required amount of liquid and to drop it in the container unit of powder, and the powder and the required liquid is stirred to mix; the step is repeated until the liquid prepared reaches the required degree of density.

Although all users follow the method mentioned above to prepare liquid for a density currently, they estimate the value on the balance by the naked eye when adding powder in the container unit; further, the dropper is used manually to absorb liquid and then to drop it in the container unit, so errors occur easily during the preparation so that the density of prepared liquid cannot meet the requirements of use; besides, careful adding and dropping of the required ration of powder and liquid by means of manual work is a must for a precise ratio; therefore, it takes much more time to put powder and drop liquid and keep it under control, which makes the speed of preparation low and thus man hour and working procedure waste.

SUMMARY OF THE INVENTION

Thus, it is an object of this invention that a controlling mechanism is used to flexibly set up a preparation flow and powder and cold and hot water (or solvent) is infused automatically by a powder and liquid supply mechanism for achievement of precise and fast liquid density regulation.

For the purpose above, an automatic liquid density-regulating device according to this invention is provided, comprising a workbench provided with a preparation area, a stir area, and a storage area; a controlling mechanism provided at a side of the workbench and connected with a clipping unit; a powder supply mechanism located vertically on the preparation area of workbench, on which a plurality of container units may be provided; a weighing mechanism provided on the preparation area of workbench and connected to the controlling mechanism; a liquid supply mechanism provided on the preparation area of workbench, located at a side of the weighing mechanism, and connected to the controlling mechanism; an absorption mechanism provided on the preparation area of workbench and located at a side of the weighing mechanism.

DETAILED DESCRIPTION OF THE PREFERRED EMBODIMENTS

Figure 1:
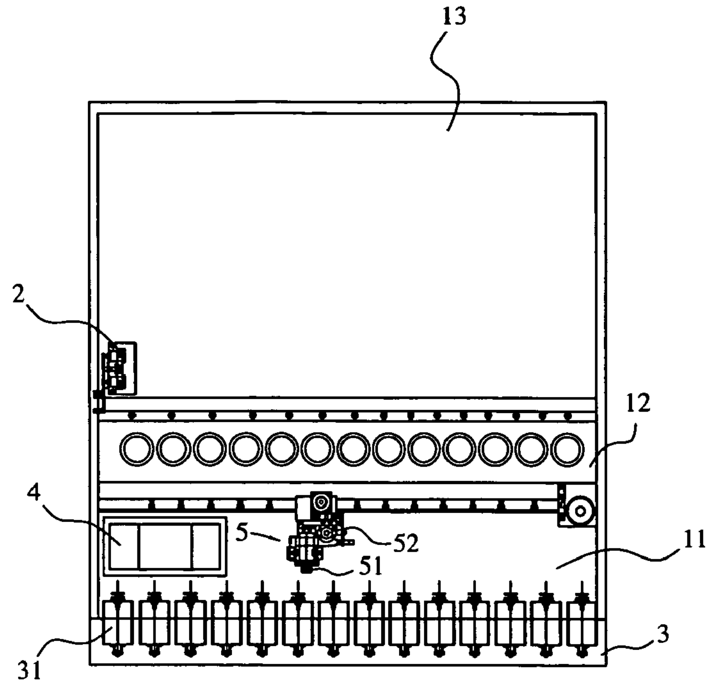
FIG. 1 is a schematic view illustrating a regulating device according to this invention.
Figure 2:
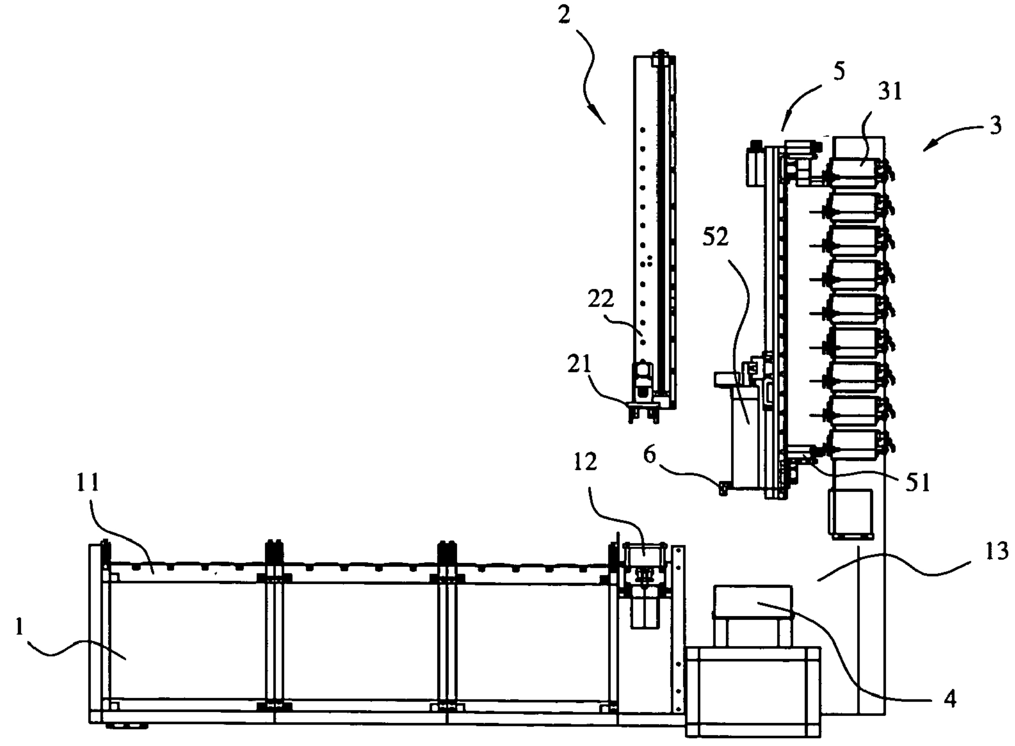
FIG. 2 is a schematic side view illustrating the status of regulating device according to this invention.

FIGS. 1 and 2 are schematic views illustrating a regulating device and the side-glance status of regulating device according to this invention, respectively. As shown in the figures, the automatic liquid density-regulating device according to this invention is structured with a workbench 1, a controlling mechanism 2, a powder supply mechanism 3, a weighing mechanism 4, a liquid supply mechanism 5, and an absorption mechanism 6, being able to flexibly set up a preparation flow and automatically pour powder and cold and hot water for achievement of precise and fast liquid density regulation.

The workbench 1 described above is provided with a preparation area 11, a stir area 12, and a storage area 13.

The controlling mechanism 2 is located at a side of the workbench 1 and connected with a clipping unit 21, and a control interface 22 is connected between the controlling mechanism 2 and the clipping unit 21.

The powder supply mechanism 3 is located vertically on the preparation area 11 of workbench 1, on which a plurality of container units 31 may be set horizontally.

The weighing mechanism 4 is located on the preparation area 11 of workbench 1 and connected to the controlling mechanism 2.

The liquid supply mechanism 5 is located on the preparation area 11 of workbench 1, located at a side of the weighing mechanism 4, and connected to the controlling mechanism 2, and a water inlet of the liquid supply mechanism 5 is provided with a sense unit 51 to detect a liquid level so as to keep the infused water in a proper level; the mechanism 5 comprises a plurality of liquid supply units 52 respectively supply required hot and cold water and required liquid.

The absorption mechanism 6 is located on the preparation area 11 of workbench 1 and at a side of the weighing mechanism 4. Thus, the brand new automatic liquid density-regulating device is formed with the frameworks above.

Figure 3:
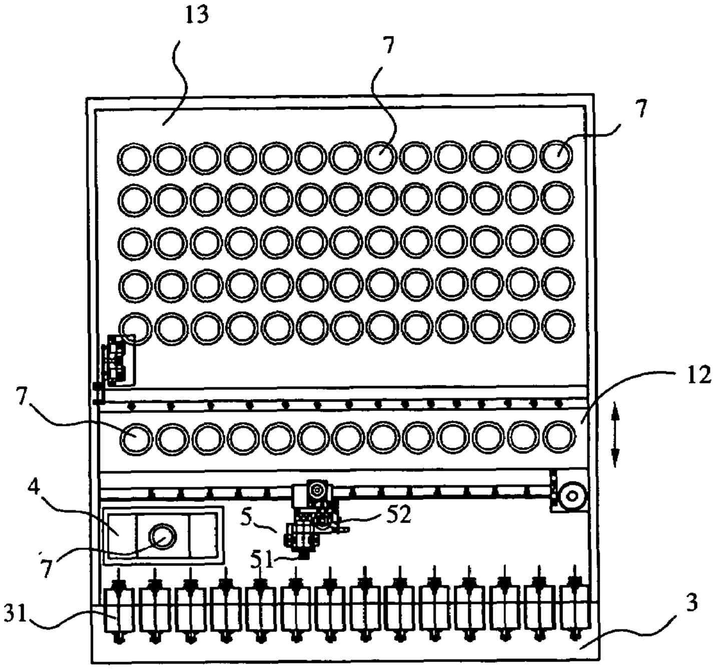
FIGS. 3 and 4 are a schematic view illustrating a service condition of the regulating device according to this invention.
Figure 4:
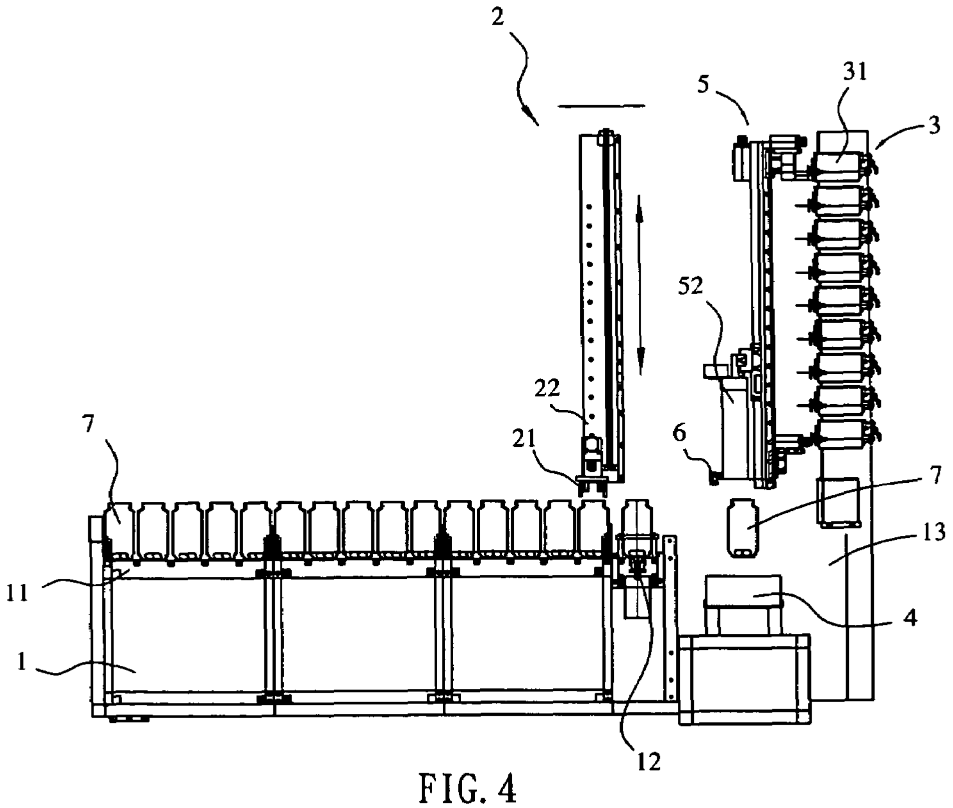

FIGS. 3 and 4 are a schematic view illustrating a service condition of the regulating device according to this invention. As shown in the figures, before the device is used, the controlling mechanism 2 may be set for a required amount of proportional powder and water to be poured and then the mechanism 2 started so that the mechanism 2 uses the control interface 22 to have the clipping unit 21 clip a required container 7 in the preparation area 11 of workbench 1 and then place it in the weighing mechanism 4. Next, for the prepared powder, the clipping unit 21 is used to clip a required container unit 31 on the powder supply mechanism 3 so that the powder in the container unit 31 is poured in the container on the weighing mechanism 4 according to the specified ratio, and the weighing mechanism 4 under the container 7 is used to give a feedback of the weight of container 7 to the controlling mechanism 2; when the specified amount of powder in the container 7 reaches a setting range, the control interface 22 of the controlling mechanism 2 gives a command to the clipping unit 21 to stop powder supply and then to place the container unit 31 on the powder supply mechanism 3. Further, the liquid supply mechanism 5 is controlled by the controlling mechanism 2 to infuse hot and cold water and required liquid into the container 7 filled with powder, the sense unit 51 is used to detect a level of liquid in the container 7, and the weighing mechanism 4 dispatches the weight of container 7 to the controlling mechanism 2 so as to keep the infused water in a proper level. After the amount of liquid in the container 7 reaches a set value, the clipping unit 21 is used to move the container 7 to the stir area 12 of workbench 1 to stir. If the liquid has not yet prepared for the required ratio of density, extra powder or liquid is added and the clipping unit 21 is used again to move the container 7 to the weighing mechanism 4 of preparation area 11; next, the absorption mechanism 6 is used to absorb redundant liquid out of the container 7 and the controlling mechanism 2 and the liquid supply mechanism 5 are used repeatedly to have the clipping unit 21 clip the container unit 31 on the powder supply mechanism 3 and pour powder and cold and hot water required in the container 7 until the density of prepared liquid reaches. After preparation, the clipping unit 21 is used again to move the container 7 to the storage area 13 of workbench 1 for users to take it out of to use.

To sum up, the automatic liquid density-regulating device according to this invention may flexibly set up the preparation flow and automatically pour powder and cold and hot water for achievement of precise and fast liquid density regulation and further, and further this invention is made to be improved and practical to meet the requirements of application for protection under patent law.

However, in the description mentioned above, only the preferred embodiments according to this invention are provided without limit to this invention and the characteristics of this invention; all those skilled in the art without exception should include the equivalent changes and modifications as falling within the true scope and spirit of the present invention.

What is claimed is:

1. An automatic liquid density-regulating device, comprising:

a workbench provided with a preparation area, a stir area, and a storage area;

a controlling mechanism located at a side of the workbench and connected with a clipping unit;

a powder supply mechanism located vertically on the preparation area of workbench, holding at least one container unit;

a weighing mechanism located on the preparation area of workbench and connected to the controlling mechanism;

a liquid supply mechanism provided on the preparation area of workbench and adjacent the weighing mechanism and connected to the controlling mechanism;

an automated absorption mechanism provided on the preparation area of workbench and at a side of the weighing mechanism, connected to a control interface and having access to a container in the stir area, and adapted to withdraw redundant liquid;

wherein liquid density in a container in the stir area is iteratively adjusted by automatically withdrawing redundant liquid and inputting selected amounts of additional powder and liquid with a selected amount of stirring between successive iterations, until a target value of liquid density is achieved.

2. The automatic liquid density-regulating device according to claim 1, wherein the controlling mechanism is connected with the clipping unit through a control interface.

3. The automatic liquid density-regulating device according to claim 1, wherein a water inlet of the liquid supply mechanism is provided with a sense unit to detect a liquid level so as to keep the infused water in a proper level.

4. The automatic liquid density-regulating device according to claim 1, wherein the liquid supply mechanism comprises a plurality of liquid supply units and each mechanism supplies required hot and cold water and required liquid.

5. The automatic liquid density-regulating device according to claim 1, wherein the stir area comprises a plurality of stir positions for stirring a plurality of containers.

* * * * *